(12) United States Patent
Kabbani et al.

(10) Patent No.: US 10,097,474 B1
(45) Date of Patent: Oct. 9, 2018

(54) SHARED RATE LIMITING

(71) Applicant: Google Inc., Mountain View, CA (US)

(72) Inventors: Abdul Kabbani, Los Gatos, CA (US); Amin Vahdat, Los Altos, CA (US)

(73) Assignee: Google LLC, Mountain View, CA (US)

( * ) Notice: Subject to any disclaimer, the term of this patent is extended or adjusted under 35 U.S.C. 154(b) by 932 days.

(21) Appl. No.: 13/886,069

(22) Filed: May 2, 2013

Related U.S. Application Data

(60) Provisional application No. 61/789,907, filed on Mar. 15, 2013.

(51) Int. Cl.
*G06F 15/16* (2006.01)
*H04L 12/891* (2013.01)

(52) U.S. Cl.
CPC .................... *H04L 47/41* (2013.01)

(58) Field of Classification Search
CPC ...................................... H04L 67/25
See application file for complete search history.

(56) References Cited

U.S. PATENT DOCUMENTS

| | | |
|---|---|---|
| 7,995,474 B2 | 8/2011 | Berstis |
| 8,249,088 B2 | 8/2012 | Gupta et al. |
| 2002/0054568 A1 | 5/2002 | Hoogenboom et al. |
| 2006/0013128 A1* | 1/2006 | Connor ............... H04L 41/0896 370/229 |
| 2009/0248213 A1* | 10/2009 | Gotoh .................. G05D 7/0635 700/282 |
| 2010/0128605 A1 | 5/2010 | Chavan et al. |
| 2010/0296397 A1 | 11/2010 | Fraccalvieri et al. |
| 2010/0322071 A1* | 12/2010 | Avdanin .............. H04L 43/0894 370/230 |
| 2012/0195323 A1* | 8/2012 | Gupta ................. H04L 63/1458 370/419 |
| 2014/0153388 A1* | 6/2014 | Webb ...................... H04L 47/20 370/230 |

OTHER PUBLICATIONS

Office Action on U.S. Appl. No. 13/886,094 dated Jun. 17, 2015.
Radhakrishnan, "Network Performance Improvements for Web Services—An End-to End View", a dissertation submitted in partial satisfaction of the requirements for the degree of Doctor of Philosophy in Computer Science, University of California, San Diego, 153 pages, 2014. http://gradworks.umi.com/36/15/3615757.html.

(Continued)

*Primary Examiner* — Moustafa M Meky
*Assistant Examiner* — Sm Z Islam
(74) *Attorney, Agent, or Firm* — McDermott Will & Emery LLP

(57) ABSTRACT

A system includes a plurality of rate limiters and a rate limiter management module. The rate limiter management module causes a processor to analyze and compare a plurality of flows each having at least one aggregation attribute, to aggregate a first group of the plurality of flows into a first aggregate flow based on the at least one aggregation attribute, and to assign the first aggregate flow to a rate limiter having at least one membership criterion. The first aggregate flow includes flows having the at least one aggregation attribute that satisfies the at least one membership criterion.

7 Claims, 8 Drawing Sheets

(56) References Cited

OTHER PUBLICATIONS

Radhakrishnan, et al. "NicPic: Scalable and Accurate End-Host Rate Limiting", 5th USENIX Workshop on Hot Topics in Cloud Comp., HotCloud'13, Jun. 25-26, 2013 San Jose, CA https://www.usenix.org/conference/hotcloud13/works.

Radhakrishnan, et al. SENIC: Scalable NIC for End-Host Rate Limiting, 11th USENIX Symposium on Networked Systems Design and Implementation, nsdi'14, Apr. 2-4, 2014, Seattle, WA https://www.usenix.org/conference/nsdi14/technical-sessions/presentation/radhakrishnan.

Tanenbaum, Andrew S., "Structured Computer Organization", 1984, Prentice-Hall, Inc., Second Edition, ISBN 0-13-854489-1, pp. 10-12.

U.S. Office Action on U.S. Appl. No. 13/886,094 dated Feb. 1, 2016.

\* cited by examiner

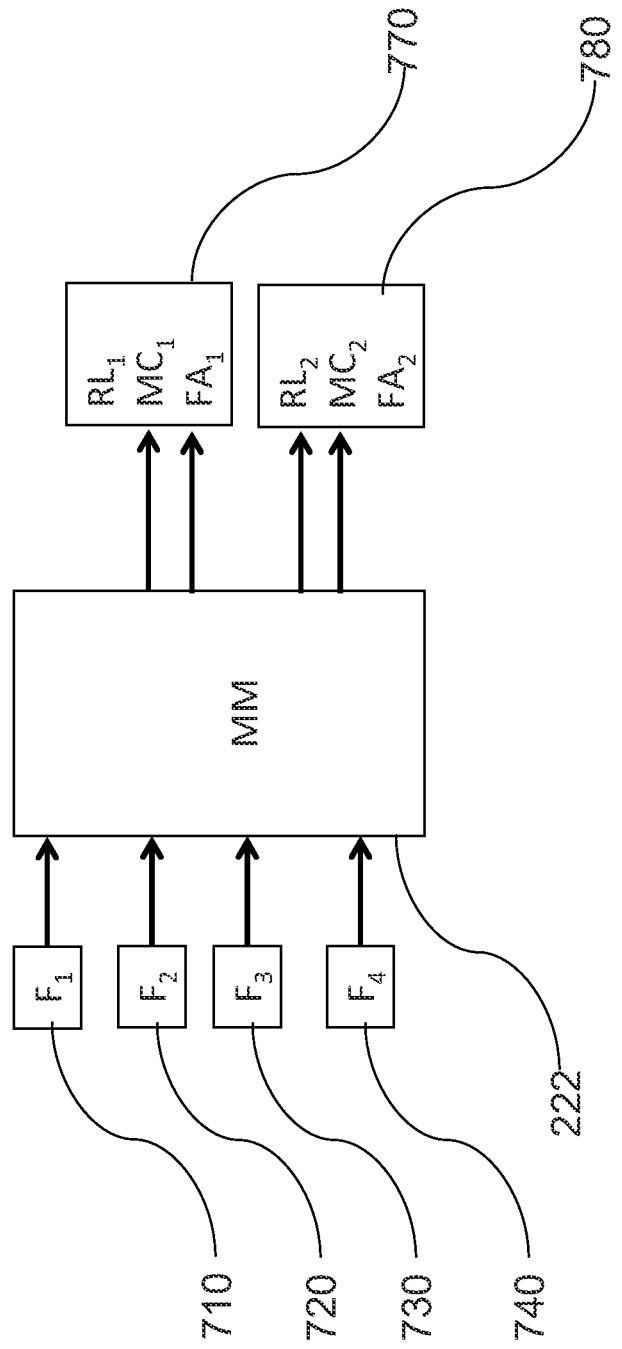

SHARED RATE LIMITING

CROSS-REFERENCE TO RELATED PATENT APPLICATIONS

This application claims a priority benefit under 35 U.S.C. § 119(e), to U.S. provisional patent application Ser. No. 61/789,907, filed Mar. 15, 2013, entitled "Hierarchical And Shared Rate Limiting". The foregoing application is incorporated herein by reference in its entirety.

FIELD OF THE INVENTION

The present disclosure relates generally to systems and methods for rate limiting of electronic communication flows.

BACKGROUND

Network communications can be gated by rate limiters. Such rate limiters can be implemented in hardware or software. Hardware rate limiters are faster and more efficient but are limited in the number of flows they can govern. Although software rate limiters are not so limited, they drain the resources of the processors on which they execute and can burden computing devices because of the computational resources they consume.

SUMMARY

In one aspect, a system for providing rate limiting is disclosed. The system manages computer network traffic through a network switch and includes a plurality of rate limiters. Each of the rate limiters has at least one membership criterion. The system also includes a memory-storing computer executable instruction implementing a rate limiter manager module. When executed, the rate limiter manager module causes the processor to compare a plurality of flows traversing the switch, each of the flows having at least one aggregation attribute, to aggregate a first group of the plurality of flows into a first aggregate flow based on the at least one aggregation attribute, and to assign the first aggregate flow to a first rate limiter having the at least one membership criterion satisfied by the at least one aggregation attribute.

In a further aspect, a computer-implemented method for providing rate limiting is disclosed. The method includes providing a plurality of rate limiters, each of the rate limiters having at least one membership criterion, comparing a plurality of flows traversing the switch, each of the flows having at least one aggregation attribute, aggregating a first group of the plurality of flows into a first aggregate flow based on the at least one aggregation attribute, and assigning the first aggregate flow to a first rate limiter having the at least one membership criterion satisfied by the at least one aggregation attribute.

In another aspect, a computer-readable storage medium having instructions stored therein is disclosed. The instructions, when executed by a processor, cause the processor to perform several operations. The operations include providing a plurality of rate limiters, each of the rate limiters having at least one membership criterion, comparing a plurality of flows traversing the switch, each of the flows having at least one aggregation attribute, aggregating a first group of the plurality of flows into a first aggregate flow based on the at least one aggregation attribute, and assigning the first aggregate flow to a first rate limiter having the at least one membership criterion satisfied by the at least one aggregation attribute.

In one aspect, a system for providing rate limiting is disclosed. The system manages computer network traffic through a network switch and includes a plurality of rate limiters each having a plurality of flows assigned thereto. The plurality of flows assigned to each rate limiter form respective aggregate flows. The system further includes a memory storing computer executable instruction implementing a rate limiter manager module, which when executed by a processor causes the processor to receive a new flow traversing the switch, the new flow having a flow rate, identify a first of the plurality of rate limiters for which the flows in its corresponding aggregate flow have flow rates similar to the flow rate, assign the new flow to first rate limiter, thereby adding it to the aggregate flow associated corresponding to the first rate limiter, and increase an aggregate rate limit of the first rate limiter based on the flow rate of the new flow.

In another aspect, a method for providing rate limiting is disclosed. The method includes providing a plurality of rate limiters each having a plurality of flows assigned thereto. The plurality of flows assigned to each rate limiter form respective aggregate flows. The method further includes receiving a new flow traversing the switch, the new flow having a flow rate, identifying a first of the plurality of rate limiters for which the flows in its corresponding aggregate flow have flow rates similar to the flow rate, assigning the new flow to first rate limiter, thereby adding it to the aggregate flow associated corresponding to the first rate limiter, and increasing an aggregate rate limit of the first rate limiter based on the flow rate of the new flow.

In yet another aspect, a computer-readable storage medium having instructions stored therein is disclosed. When executed by a processor, the instructions cause the processor to perform operations including providing a plurality of rate limiters each having a plurality of flows assigned thereto. The plurality of flows assigned to each rate limiter form respective aggregate flows. The operations further include receiving a new flow traversing the switch, the new flow having a flow rate, identifying a first of the plurality of rate limiters for which the flows in its corresponding aggregate flow have flow rates similar to the flow rate, assigning the new flow to first rate limiter, and increasing an aggregate rate limit of the first rate limiter based on the flow rate of the new flow.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and form a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 8 is a further block diagram of an example method of rate limiting based on aggregation attributes.

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

The present disclosure describes systems, methods and computer-readable media for assigning flows to rate limiters.

A flow is a sequence of packets sent from a particular source to a particular destination. The particular destination of a flow can be a unicast, anycast, or multicast destination. The flow can include all packets in a specific transport connection or a media stream. However, the flow need not correspond to a one-to-one mapping to the transport connection. The flow can be characterized by a rate that is expressible as a quantity of packets over a temporal unit or as a quantity of bytes over the temporal unit.

A rate limiter is a mechanism for controlling the rate at which packets are directed. A rate limiter acts as a throttle or filter that passes an input flow as an output flow. The rate of the input flow is subject to a 'cap' or absolute value above which packets in the input flow will be dropped or delayed. Rate limiters can be implemented using hardware or using software. Generally, each flow passed through a device can be assigned to a rate limiter.

Flow control methods are directed to efficient assignment of flows to rate limiters. For example, flows can be assigned to rate limiters using rule-based logic. In some instances, assigning each flow to a rate limiter overutilizes processing resources. To avoid such overutilization, flows can be aggregated and directed to a common rate limiter.

In at least one implementation, a flow can be defined by source and destination addresses, ports, and the transport protocol type, among other characteristics. The flow in one implementation is a unidirectional sequence of packets sharing a common source IP address, destination IP address, SNMP interface, IP protocol, source port for TCP, destination port for TCP, and IP type of service. In another implementation, each flow bears a transmit descriptor including a MAC source address, a MAC destination, a VLAN number, a priority field, a source IP, a destination IP, a source port, a destination port, a virtual machine ID, and a flow ID.

While efficient allocation of flow limiters may be useful in almost any networked device, it is particularly valuable in the context of data centers. In contemporary data centers, thousands and in some cases millions of flows may traverse various switches at any given time. Inefficient use of rate limiters can lead to increased congestion as well as power consumption.

Figure 1:
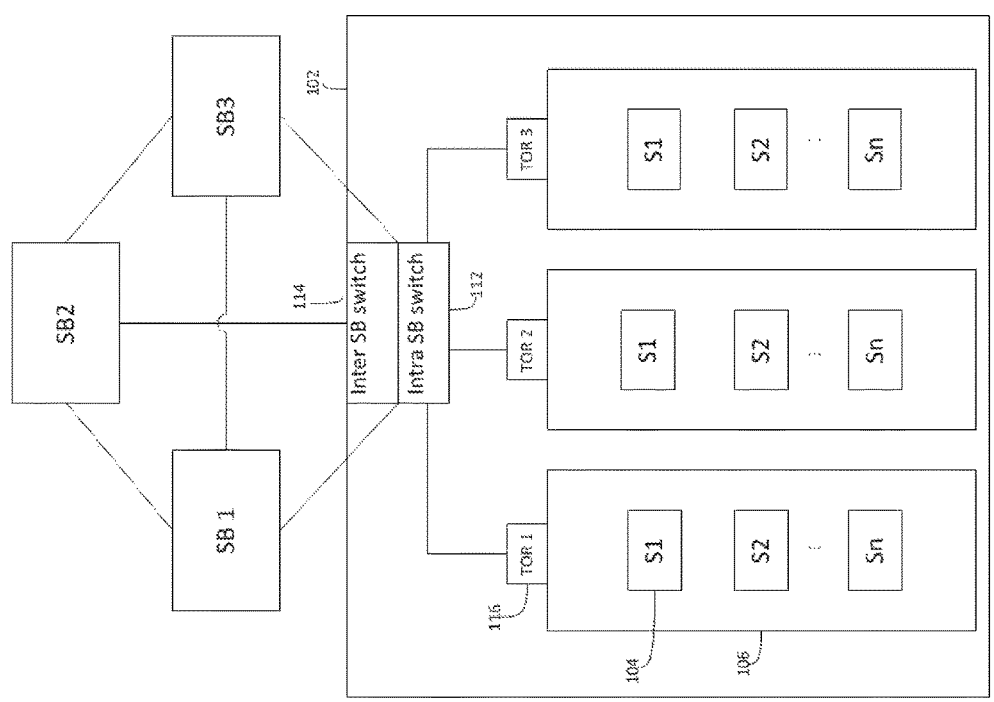
FIG. 1 is a block diagram of an example data center.

FIG. 1 is a block diagram of an example data center 100. The data center 100 includes several interconnected superblocks 102 (also referred to as "pods"). Each superblock 102 includes on the order of several hundred to more than one thousand servers 104 arranged in server racks 106. The superblocks 102 are communicatively coupled to one another by optical and/or electrical communication links 108. They can be connected directly, or through spine blocks (not shown), which serve as switches for routing data communications between the superblocks 102. Each superblock includes an intra superblock switch 112 for routing communications among the racks 106 included in the superblock 102 or to an inter-superblock switch 114, which routes data communications between superblocks 102. In some implementations, the inter-superblock switch 114 can be a spine block or it can be switch within the superblock 102 for direct routing of communications between superblocks 102.

As indicated above, each superblock 102 includes a large number of servers 104. In some implementations, a superblock 102 may include hundreds or more than one thousand servers. The servers 104 are arranged in server racks 106. A top-of-rack switch 116 routes data communications between servers 104 within a given rack 106 and from servers 104 within the rack to the inter-superblock switch 114 or the intra-superblock switch 112.

Each server 104 includes at least one processor, memory, and a network interface card (NIC), coupled to one another via a data bus. The processor executes computer executable instructions stored in the memory to implement a wide variety of applications and operations. In some implementations, the processor executes computer executable code associated with a hypervisor, also referred to as a virtual machine manager. An implementation including a hypervisor is shown in FIG. 2 and is discussed below.

As would be understood by a person of ordinary skill in the art, a hypervisor is an application that creates and manages virtual machines, providing the virtual machines with a virtual operating platform. In such implementations, hypervisors can be used to emulate virtual hardware, partition physical hardware, virtualize physical hardware, and provide access to computing environments, allowing multiple operating systems to run concurrently on a host processor. Native hypervisors can run directly on the host processor. In some implementations, one or more other servers 104 execute one or more types of hypervisors rather than operating systems.

Figure 2:
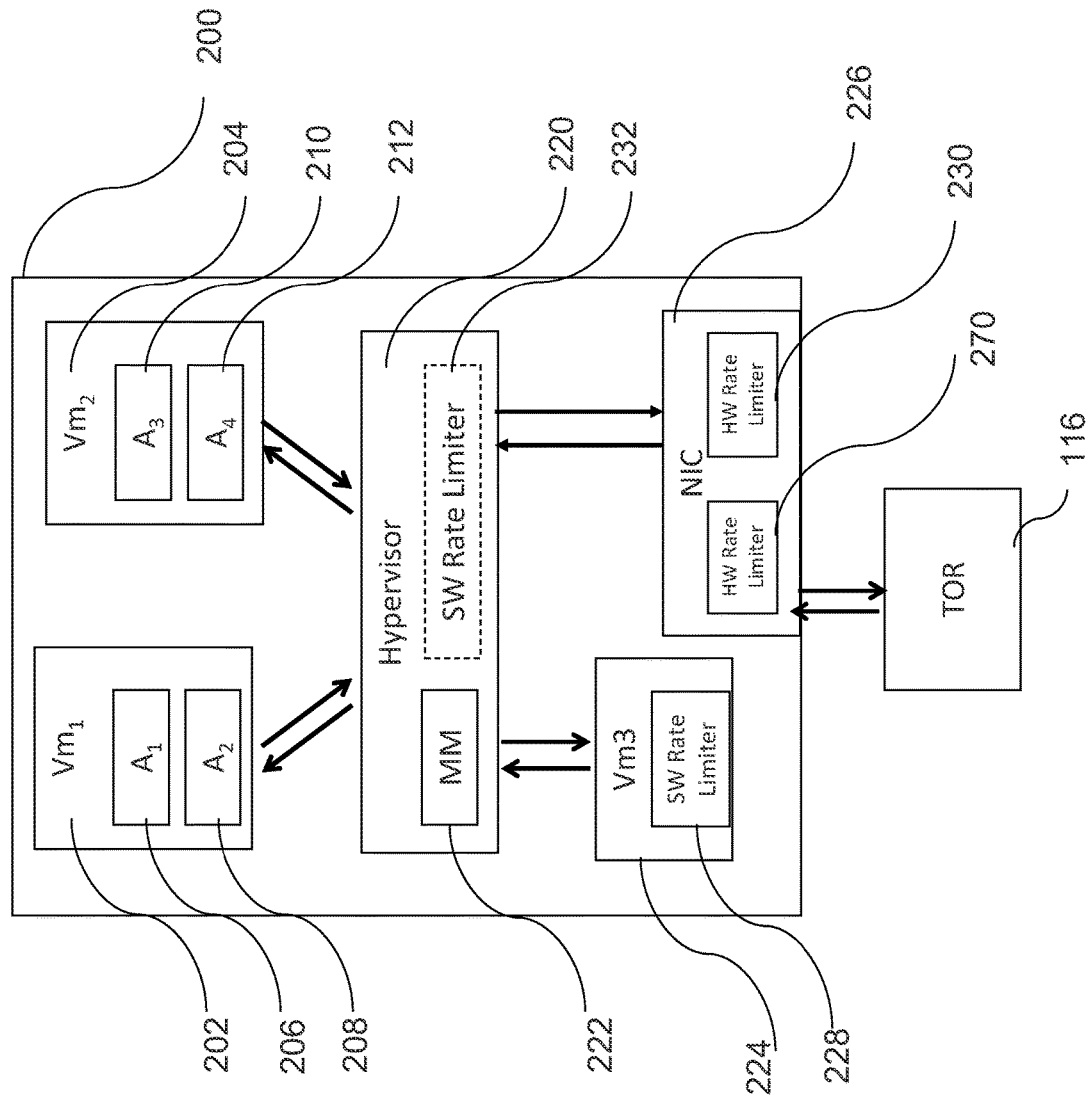
FIG. 2 is a block diagram of an example server.

FIG. 2 shows a block diagram depicts an example server 200. The server 200 includes a hypervisor 220, three virtual machines 202, 204, and 224, and a network interface card ("NIC") 226. The server 200 communicates with a top of rack switch 205, similar to the top of rack switch 116 shown in FIG. 1. Each of the virtual machines 202, 204, and 224 can host a variety of applications. The server 104 may be a file server, application server, web server, proxy server, appliance, network appliance, gateway, gateway server, virtualization server, deployment server, SSL VPN server, or firewall.

The server 200 executes the hypervisor 220, which instantiates the first virtual machine first virtual machine 202, the second virtual machine 204, and the third virtual machine 224. The first virtual machine 202 hosts a first application 206 and a second application 208. The second virtual machine hosts a third application 210 and a fourth application 212. For example, the applications can include database servers, data warehousing programs, stock market transaction software, online banking applications, content publishing and management systems, hosted video games, e-mail servers, travel reservation systems, customer relationship management applications, inventory control management databases, and enterprise resource management systems. In some implementations, the virtual machines host other kinds of applications.

The virtual machines share the physical resources of the server 104, and execute a variety of applications in isolated environments instantiated by the hypervisor. Data communications originating from an application within a virtual machine to other physical or virtual machines are also managed by the hypervisor. The hypervisor can forward communications directed to off-server devices or off-server virtual machines to the NIC, which the hypervisor controls in part through a NIC driver module.

Each of the hypervisor 220, the third virtual machine 224, and the NIC 226 includes at least one rate limiter. The hypervisor 220 and the third virtual machine execute includes rate limiters 232 and 228 that are implemented in software. A rate limiter that is implemented in software can be implemented using flow control code. Such code can be computer executable code executed by a general purpose processor which receives packets for transmission and determines whether they can be delayed, dropped, or passed. Rate limiters can be implemented in software, for example, using a token bucket scheme. A software rate limiter can include policing, queuing, and congestion control techniques.

Referring again to FIG. 2, the NIC 226 also includes a first rate limiter 230 and a second rate limiter 270. Unlike the rate limiters of the hypervisor 220 and the third virtual machine 224, the rate limiters 230 and 270 are implemented in hardware. In some implementations, the NIC can include several rate limiters. A hardware rate limiter is implemented using a physical device structure such as a switch. Rate limiters can also be implemented in hardware, for example, in a converged network adapter. Whereas hardware rate limiters are finite—that is, only a finite number of them can exist in a single device, such as the NIC 226—a much higher number of software rate limiters can be implemented in a given device. However, hardware limiters require less system resources and can be more efficient, whereas software rate limiters can be computationally intensive and less efficient than their hardware-implemented counterparts.

As described above, the rate limiter acts as a throttle to limit the rate at which flows can be sent or received. Flows can originate from any number of different systems, applications, or devices that communicate via the server 104. In some instances, there can be interrupts that are triggered when an application queries whether it can send a particular flow. If a particular application sends flows at overly high rates, the resulting frequent interrupts cause an inequitable distribution of system resources. Further, overutilization caused by sending flows at overly high rates can overwhelm the server 104.

Figure 3:
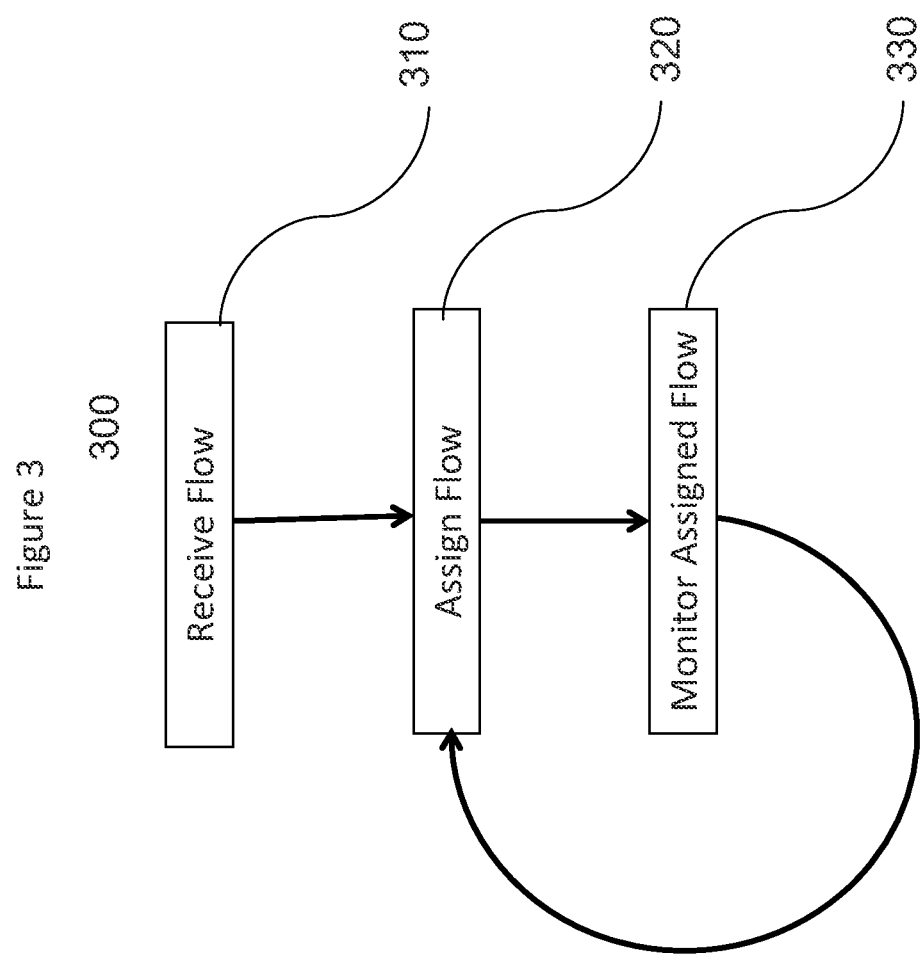
FIG. 3 is a flow diagram of an example method of allocating rate limiters.

Referring again to FIG. 2, the hypervisor 220 includes a rate limiting manager module 222. In some implementations, the rate limiting manager module 222 can be implemented in a kernel of the hypervisor 220. In other implementations, the rate limiting manager module can be implemented in a driver for the NIC 226. In some implementations, the rate limiting manager module 222 communicates with the third virtual machine 224 and the NIC 226. As shown in FIG. 3, the rate limiter manager module 222 can accomplish receiving, assigning, and monitoring of flows. The rate limiter manager module can, in some implementations, designate a given rate limiter to limit particular flows. The rate limiter manager can designate a group of rate limiters to limit particular flows.

FIG. 3 is a flow diagram 300 of an example method of allocating rate limiters. The rate limiter allocator method 300 is suitable for execution, by example, by the rate limiter manager module 222 shown in FIG. 2. The method includes receiving, assigning, and monitoring flows. Each of the processes will be described further below. First, the rate limiter manager module receives a flow (step 310). Next, the rate limiting manager module assigns the flow (step 320). Subsequent to assigning the flow, the rate limiter manager module monitors assigned flows (step 330). In response to monitoring, the rate limiter manager module may reassign one or more flows to different rate limiters (step 320). Various example implementations of such flow assignment and monitoring flows will be described in greater detail below.

In monitoring assigned flows, the rate limiter manager module 222 can track the relative flow rates of each rate-limited flow. In some implementations, the rate limiter manager module 222 maintains separate ordered lists of flows assigned to hardware rate limiters and software rate limiters. For example, the rate limiter manager module 222 can monitor N software rate limited flows denoted $F_{SW0} \ldots F_{SW(N-1)}$, where $F_0$ has the lowest flow rate and $F_{SW(N-1)}$ has the highest flow rate. Similarly, for monitoring M flows limited by hardware rate limiters, such flows can be denoted as $F_{HW0} \ldots F_{HW(M-1)}$, where $F_{HW0}$ has the lowest flow rate and $F_{HW(M-1)}$ has the highest flow rate. The rate of a given flow can be denoted as R(F).

After the rate limiter manager module 222 receives a new flow (step 310), the rate limiter manager module 222 assigns the flow to a rate limiter (step 320). For example, the rate limiter manager module 222 can assign the flow to a rate limiter that is implemented in hardware or a rate limiter that is implemented in software. The rate limiter manager module 222 can assign one or more flows to hardware rate limiters 230 and 270 included in the NIC 226, as shown in FIG. 2. The rate limiter manager module can assign other flows to software rate limiters such as the software rate limiters 228 and 232, shown in FIG. 2. Such rate limiters can be classified, for example, into a group of hardware rate limiters and a group of software rate limiters. Following assignment of the flow, the rate limiter manager module monitors the assigned flows (step 330).

Figure 4:
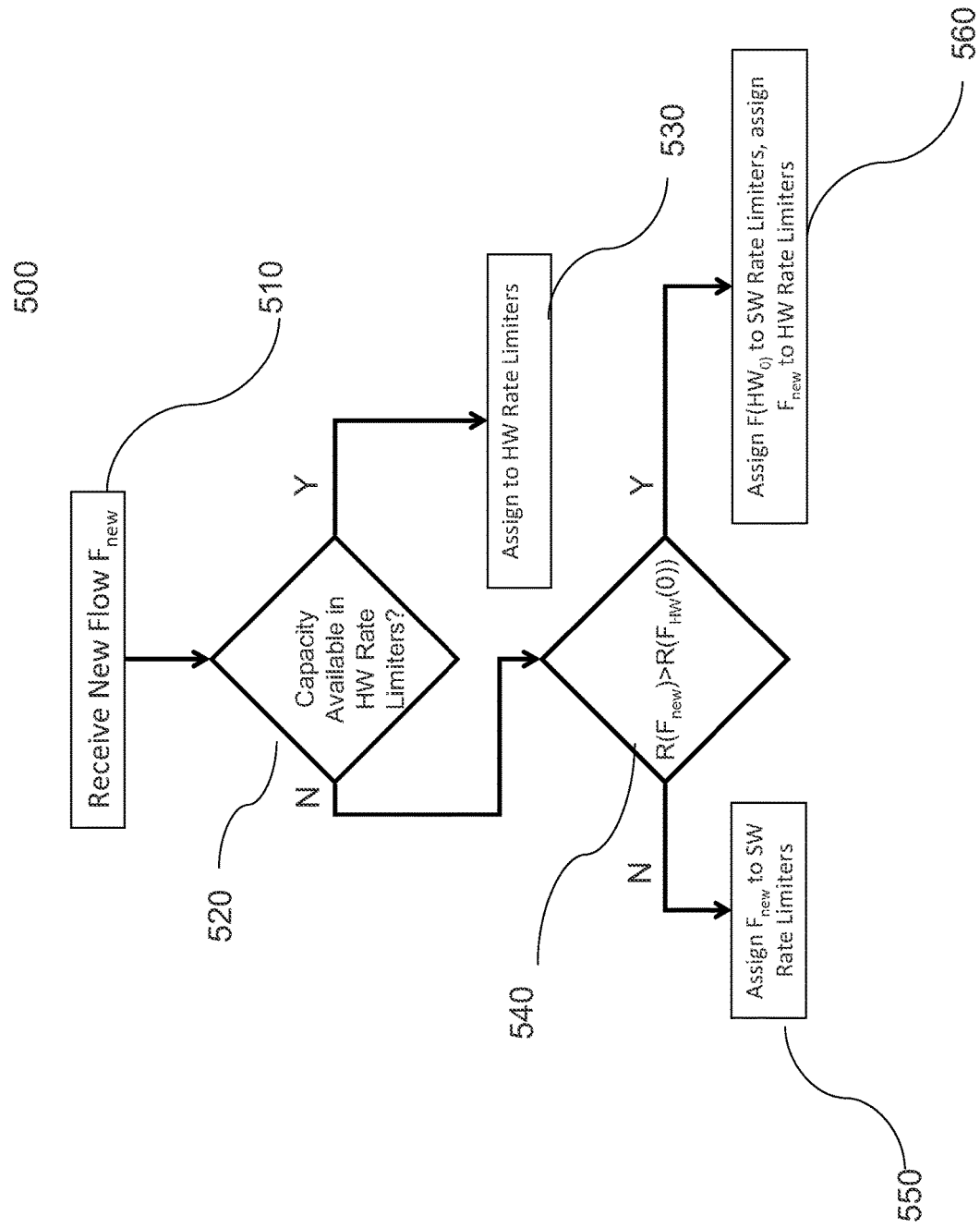
FIG. 4 is a flow diagram of an example method of rate limiter allocation based on rate limiter capacity.

Turning now to FIG. 4, a flow diagram depicts an example method of rate limiter allocation based on rate limiter capacity. Each rate limiter has a capacity that corresponds to the number of flows that can be controlled by the rate limiter. A rate limiter manager module, such as the rate limiter manager module shown in FIG. 2, receives a new flow $F_{new}$ (step 510). The rate limiter manager module 222 determines whether the available capacity of a group of hardware rate limiters is sufficient (step 520). In other words, the rate limiter manager module 222 evaluates whether the available capacity of the hardware rate limiters exceeds a threshold capacity. If the group of hardware rate limiters has sufficient available capacity, the rate limiter manager module 222 assigns the new flow to a rate limiter within the group of hardware-implemented rate limiters (step 530). In other words, the rate limiter manager module 222 can assign the new flow to a given hardware rate limiter if that hardware rate limiter has sufficient available resources to limit that flow.

If the group of hardware rate limiters lacks sufficient available capacity, the rate limiter manager module 222 determines whether a rate of the new flow $R(F_{new})$ exceeds the lowest rate of any flow assigned to the hardware rate limiters, i.e., whether $R(F_{new}) > R(F_{HW0})$ (step 540). If the rate limiter manager module 222 determines that the rate of the new flow $R(F_{new})$ is less than the lowest rate of the flows assigned to the hardware rate limiters, $R(F_{HW0})$, then the rate limiter manager module 222 assigns the new flow $F_{new}$ to a software rate limiter (step 550). Alternatively, if $R(F_{new}) > R(F_{HW0})$, the rate limiter manager module 222 assigns $F_{HW0}$ to a software rate limiter and assigns the new flow $F_{new}$ to a hardware rate limiter previously controlling the reassigned flow (step 560).

Figure 5:
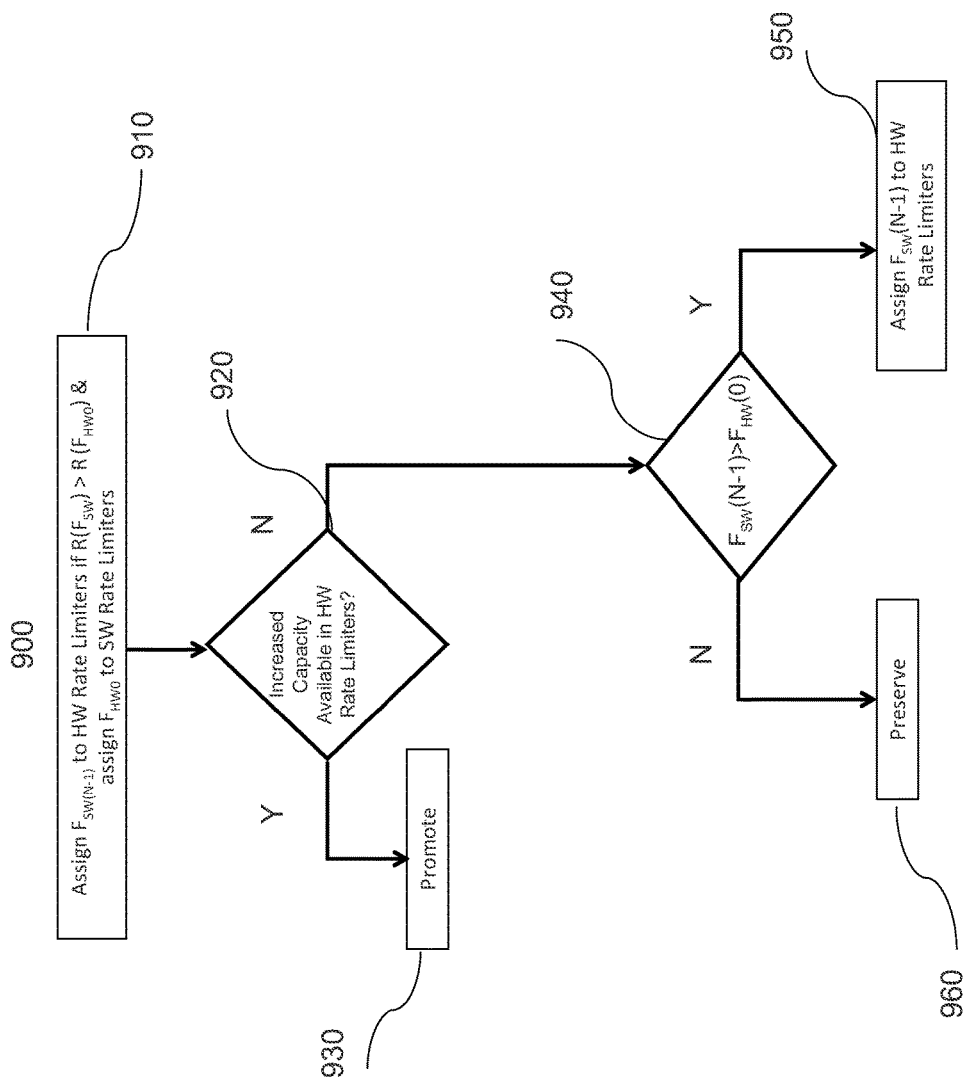
FIG. 5 is a flow diagram of an example method of rate limiter allocation.

FIG. 5 is a flow diagram 900 of an example method of rate limiter allocation. As indicated above, the rate limiter manager module 222 can be configured to monitor flows after their initial assignment to rate limiters, as shown in FIG. 3 (step 330). As shown in FIG. 5, a rate limiter manager module monitors flows $F_{SW0}$ through $F_{SW(N-1)}$ (step 910).

Then, the rate limiter manager module 222 evaluates the available capacity of the hardware rate limiters (step 920). If the hardware rate limiters have available capacity, flows assigned to the software rate limiters are promoted (i.e., assigned) to the hardware rate limiters (step 930). If, instead, the hardware rate limiters do not have sufficient available capacity, the rate limiter manager module evaluates the rate of the flow with the highest rate assigned to software rate limiters to determine whether that rate exceeds the rate of the flow with the lowest rate that is hardware rate-limited, i.e., whether $F_{SW}(N-1) > F_{HW}(0)$ (step 940). The flow with lowest rate that is hardware rate-limited is reassigned to one of the software rate limiters if its rate is exceeded by a flow assigned to the software limiters (step 950). If the rate of the flow $F_{HW}(0)$ is not exceeded, its assignment to the hardware rate limiters is preserved (step 960).

The rate limiter manager module 222 does not necessarily require that the new flow be assigned to a previously unassigned hardware rate limiter or that all hardware rate limiters be utilized to the same extent. In some implementations, the rate limiter manager module employs sampling techniques to sample flows in determining the rate limiter allocation.

In various examples described above, the rate limiter manager module assigned each flow to a corresponding rate limiter. A challenge common to rate-limiting efforts is the cost incurred when allocating a rate limiter for each flow. Such costs are incurred regardless of the 'level' of flow, that is, where in the hierarchy of a data center the flow occurs, for example. As noted above, flows can occur at multiple levels in a hierarchy, e.g., between a destination IP and a virtual machine user, or within a kernel socket. This cost can be viewed in terms of overutilization of a processor overhead with respect to software rate limiters. With respect to hardware rate limiters, costs are incurred in obtaining the physical switching devices, for example.

To mitigate such costs, multiple flows can be combined into a single rate limiter. That is, a rate limiter manager module can group flows together such that the flows are limited to a shared total flow rate. The rate limiter manager module can be configured so as not to interfere with individual per-flow shares and to preserve the accuracy of the information contained in the flow. In some implementations, the rate limiter is capped or upper-bounded by an aggregate rate of the individual flows subject to aggregation. Such an aggregate rate can be set to a desired rate.

In some implementations, a rate limiter manager module, such as the rate limiter manager module 222 shown in FIG. 2, permits flow aggregation using various techniques. In at least one implementation, the rate limiter manager module is configured to determine which flows to aggregate based on analyzing attributes of each flow, referred to as "aggregation attributes." In some implementations, an aggregation attribute includes information derived from header information for the flow. In some implementations, the aggregation attribute can include transmit descriptor information such as source and destination. As a further example, the aggregation attribute is the rate of the flow.

Further, in some implementations, the flows are aggregated based on individual per-flow rates that are expressed implicitly and explicitly. In some implementations, the rate limiter manager module is configured to distinguish between explicitly- and implicitly-expressed flow rates. Flow rates are expressed explicitly, for example, in cloud performance isolation schemes and under rate control protocols. The rate limiters of some implementations can monitor the desired rates of each individual flow traversing it. The rate limiter manager module can enforce the rate limits using a weighted round-robin scheme, for example. The rate limiter manager module can alternatively enforce the flow rates using a proportional distribution. Such implementations can avoid problems associated with large individual flows, such as burstiness.

In some implementations, aggregated flows are expressed implicitly, for example, with quantized congestion notification and high bandwidth, ultra low latency schemes. In a quantized congestion notification scheme, flows can become "backlogged" at a rate limiter, and switches can send multiple control messages to stanch the flow rates during congested periods. However, a rate limiter may not distinguish between which flow is causing congestion and thus limits the rate of multiple flows indiscriminately. In some implementations, the rate limiter manager module can be configured to receive information about attributes of the flows and to aggregate the flows based on that information. Based on such information, the rate limiter manager module can monitor the flows assigned to each rate limiter and to adjust the aggregate rate based on a feedback message, for example. Each rate limiter can be configured to decrease a flow rate for a flow that triggered the feedback message, that is, the congestion-causing flow. The rate limiter manager module can be configured to reduce the rate of the congestion-causing flow according to a linear decreasing function, a data center TCP algorithm, or according to other algorithms. In some implementations, the rate limiter manager module is configured to drop or delay packets within the flows causing congestion.

Each flow has at least one aggregation attribute. A rate limiter manager module, such as the rate limiter manager module 222 shown in FIG. 2, can analyze the aggregation attributes of the flows and can aggregate flows having similar or comparable aggregation attributes together to form an aggregated flow. In some implementations, the aggregation attribute of each flow can be an origin or source of the flow. For example, the rate limiter manager module 222 can assign all flows coming from the same application, virtual machine, server, server rack, or other switch to a particular rate limiter depending on the hierarchy of a data center in which the rate limiter manager module 222 is implemented. In some implementations, the source, destination, quality of service, and/or type of application associated with a flow can be used as aggregation attributes. In at least one implementation, the rate limiter manager module aggregates flows to allocate system resources fairly among entities operating on the same computing device.

Figure 6:
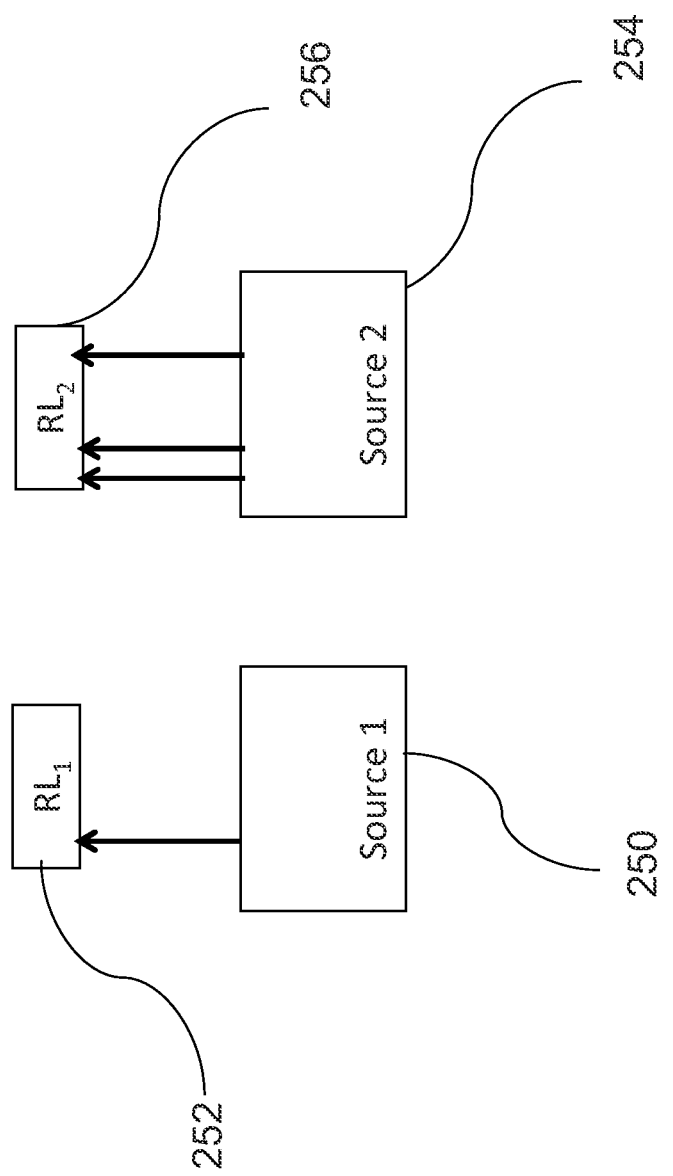
FIG. 6 is a block diagram of an example method of rate limiter allocation based on an aggregation attribute.

FIG. 6 is a block diagram of an example method of rate limiter allocation based on an aggregation attribute. The example method shown in FIG. 6 is suitable for use in a data center, such as the data center 100. FIG. 6 shows a first source 250, a second source 254, a first rate limiter 252, and a second rate limiter 256. The first source 250 and a second source 254 each originate flows. A rate limiter manager module (not shown), such as the rate limiter manager module 222 shown in FIG. 2, can assign flows to each rate limiter based on the flow source, the flow source being the aggregation attribute. For example, flows from the first source 250 are assigned to the first rate limiter 252. Flows from the second source 254 are assigned to the second rate limiter. The sources can be a common application, virtual machine, server, rack, or other entity within the data center, depending on where in the switching hierarchy the rate limiter manager module 222 resides.

Figure 7:
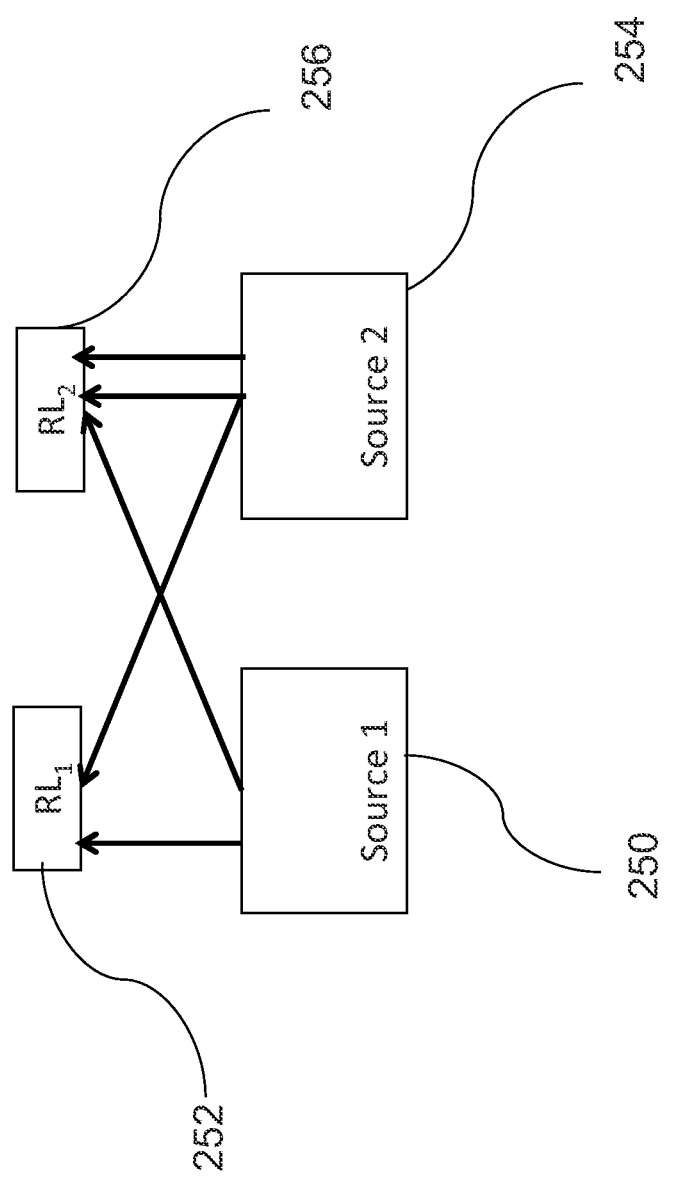
FIG. 7 is a block diagram of an example method of rate limiter allocation based on an aggregation attribute.

FIG. 7 is a block diagram of an example method of rate limiting based on an aggregation attribute. FIG. 7 includes a first source 250, a second source 254, a first rate limiter 252, and a second rate limiter 256. The first source 250 and a second source 254 each originate flows. A rate limiter manager module (not shown), such as the rate limiter manager module 222 shown in FIG. 2, can assign flows to each rate limiter based on an aggregation attribute other than flow source. For example, the aggregation attribute can include the flow rate, as described below. For example, flows from the first source 250 and flows from the second source 254 are assigned to the first rate limiter 252. Flows from the second source 254 are assigned to the first rate limiter 252 and the second rate limiter 254. In some implementations, the rate limiter manager module 222 can assign flows to a rate limiter that are not aggregated into an aggregate flow. In other words, in some implementations, the rate limiter manager module 222 does not necessarily require that each flow assigned to a rate limiter be aggregated.

In general, each rate limiter has at least one membership criterion that must be satisfied by a flow in order for the rate limiter manager module 222 to assign the flow to that rate limiter. The membership criterion for the rate limiter represents a condition for assignment of a given flow. The rate limiter manager module 222 can analyze the aggregation attributes of the flows and compare them to membership criteria of the rate limiters in some implementations. A rate limiter need not have a membership criterion in order for flows to be assigned to it; moreover, in some implementations, a rate limiter may have membership criteria that must each be satisfied by a flow as a prerequisite for assignment.

Membership criteria can change and can be continually redefined. For example, membership criteria for a particular rate limiter can be altered as the use of system resources fluctuates. If the number of flow origins being monitored changes, the membership criterion for each rate limiter could change, necessitating a redistribution of the flows. Alternatively, upon a change in membership criteria, the rate limiter manager module can be configured to separate flows that were previously aggregated together or to aggregate new flows.

By way of example, in one implementation, the aggregation attribute corresponds to the flow origin. In at least one implementation, the membership criterion of a rate limiter is origin from the same application. The membership criterion of another rate limiter, for example, can be a flow source that is a particular device. Thus, a flow with an aggregation attribute being a given origin is assigned to the rate limiter whose membership criterion requires that origin.

In another implementation, the aggregation attribute corresponds to the flow rate. The rate limit for each rate limiter can be set to equal a sum of the average rates of all of the flows assigned to that particular rate limiter. The rate limiter manager module can be configured to control the rate limiters to limit the rate of flows aggregated within each rate limiter so as not to exceed a maximum flow rate. In some implementations, the rate limiter manager module imposes a ceiling rate (i.e., a maximum rate) that changes as the sum of the average rates change.

In some implementations, flows are differentiated into multiple tranches of flows. Each tranche includes flows sharing similar characteristics. The rate limiter manager module then assigns each tranche of flows to a rate limiter. If the characteristics of a flow assigned to a given tranche differ significantly from its fellow flows assigned to the rate limiter, the rate limiter manager module reassigns the flow to a different tranche. For example, in a system that has four rate limiters, the flows might be assigned to the rate limiters based on which quartile of flow rates they fall into; e.g., flows having flow rates in the lowest quartile are assigned to a first rate limiter, flows in the second-lowest quartile are assigned to a second rate limiter, and so forth. In another implementation, flows are aggregated based on the order of magnitude of their respective flow rates.

FIG. 8 is a block diagram of an example method of rate limiting based on aggregating flows. The rate limiter manager module 222 receives a plurality of flows 710, 720, 730 and 740. In some implementations, the rate limiter manager module 222 analyzes the aggregation attribute of each flow. The rate limiter manager module 222 compares the aggregation attributes of each flow and aggregates flows having similar or identical aggregation attributes. The rate limiter manager module 222 assigns a first group of flows to a first rate limiter 770. The rate limiter manager module 222 assigns a second group of flows to a second rate limiter 780. The rate limiter manager module can redirect, drop, or delay flows that are not aggregated.

As described above, in some implementations, the rate manager module facilitates rate limiting in accordance with administrative policies. For example, the rate limiter module 222 can ensure that flows for a particular source or tenant in a data center, such as the data center 100. In some implementations, the rate limiter manager module assigns the flow in accordance with a min-max fairness criterion. Such a criterion can be used to ensure fairness in the limits placed on flows having a particular origin, for example.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented system for managing computer network traffic through a network switch, the system comprising:
    a plurality of rate limiters each having a plurality of flows assigned thereto, the plurality of flows assigned to each rate limiter forming respective aggregate flows, wherein:
        for every rate limiter, the flows assigned to the respective rate limiter have respective flow rates that have a common order of magnitude, or
        for every rate limiter, the flows assigned to the respective rate limiter have respective flow rates that fall within a common percentile of the flow rates of all flows traversing the switch; and
    a memory storing computer executable instructions implementing a rate limiter manager module, which when executed by a processor causes the processor to:
        receive a new flow traversing the switch, the new flow having a flow rate;
        identify a first rate limiter of the plurality of rate limiters such that the flow rate of the new flow falls within the common order of magnitude of the flow rates of the flows assigned to the first rate limiter or the flow rate of the new flow falls within the common percentile of flow rates of the flows assigned to the first rate limiter;
        assign the new flow to the first rate limiter, thereby adding the new flow to the aggregate flow corresponding to the first rate limiter; and
        increase an aggregate rate limit of the first rate limiter based on the flow rate of the new flow.

2. The system of claim 1, wherein each of the rate limiters is configured to limit the rate of its respective aggregate flow to be less than the aggregate rate of the plurality of flows in the aggregate flow.

3. A method for managing computer network traffic through a network switch, the method comprising:

providing a plurality of rate limiters each having a plurality of flows assigned thereto, the plurality of flows assigned to each rate limiter forming respective aggregate flows wherein:
  for every rate limiter, the flows assigned to the respective rate limiter have respective flow rates that have a common order of magnitude, or
  for every rate limiter, the flows assigned to the respective rate limiter have respective flow rates that fall within a common percentile of the flow rates of all flows traversing the switch;
receiving a new flow traversing the switch, the new flow having a flow rate;
identifying a first rate limiter of the plurality of rate limiters such that the flow rate of the new flow falls within the common order of magnitude of the flow rates of the flows assigned to the first rate limiter or the flow rate of the new flow falls within the common percentile of flow rates of the flows assigned to the first rate limiter;
assigning the new flow to the first rate limiter, thereby adding the new flow to the aggregate flow corresponding to the first rate limiter; and
increasing an aggregate rate limit of the first rate limiter based on the flow rate of the new flow.

4. The method of claim 3, wherein each of the rate limiters is configured to limit the rate of its respective aggregate flow to be less than the aggregate rate of the plurality of flows in the aggregate flow.

5. A non-transitory computer-readable storage medium having instructions stored thereon that, when executed by a processor, cause the processor to perform operations comprising:
providing a plurality of rate limiters each having a plurality of flows assigned thereto, the plurality of flows assigned to each rate limiter forming respective aggregate flows, wherein:
  for every rate limiter, the flows assigned to the respective rate limiter have respective flow rates that have a common order of magnitude, or
  for every rate limiter, the flows assigned to the respective rate limiter have respective flow rates that fall within a common percentile of the flow rates of all flows traversing the switch;
receiving a new flow traversing the switch, the new flow having a flow rate;
identifying a first rate limiter of the plurality of rate limiters such that the flow rate of the new flow falls within the common order of magnitude of the flow rates of the flows assigned to the first rate limiter or the new flow falls within the common percentile of flow rates of the flows assigned to the first rate limiter;
assigning the new flow to the first rate limiter, thereby adding the new flow to the aggregate flow corresponding to the first rate limiter; and
increasing an aggregate rate limit of the first rate limiter based on the flow rate of the new flow.

6. The non-transitory computer-readable storage medium of claim 5, wherein each of the rate limiters is configured to limit the rate of its respective aggregate flow to be less than the aggregate rate of the plurality of flows in the aggregate flow.

7. A computer-implemented system for managing computer network traffic through a network switch, the system comprising:
a plurality of rate limiters each having a plurality of flows assigned thereto, the plurality of flows assigned to each rate limiter forming respective aggregate flows, wherein the plurality of flows assigned to each rate limiter have respective flow rates that have a common order of magnitude or fall within a common tranche of the flow rates of all flows traversing the switch, and wherein each of the rate limiters is configured to limit the rate of its respective aggregate flow to be less than an aggregate rate of the plurality of flows in the aggregate flow; and
a memory storing computer executable instructions implementing a rate limiter manager module, which when executed by a processor causes the processor to:
  receive a new flow traversing the switch, the new flow having a flow rate;
  identify a first rate limiter of the plurality of rate limiters such that the flow rate of the new flow falls within the common order of magnitude of the flow rates of the plurality of flows assigned to the first rate limiter or the new flow falls within the common tranche of flow rates of the plurality of flows assigned to the first rate limiter;
  assign the new flow to the first rate limiter, thereby adding the new flow to the aggregate flow corresponding to the first rate limiter; and
  increase an aggregate rate limit of the first rate limiter based on the flow rate of the new flow.

* * * * *